June 5, 1934. H. PECHSTÄDT 1,961,981
MACHINE FOR MOLDING PIPES AND OTHER HOLLOW ARTICLES
Filed Oct. 21, 1931 3 Sheets-Sheet 1

H. Pechstadt
INVENTOR

By Marks & Clerk
Attys.

June 5, 1934.  H. PECHSTÄDT  1,961,981
MACHINE FOR MOLDING PIPES AND OTHER HOLLOW ARTICLES
Filed Oct. 21, 1931   3 Sheets-Sheet 3
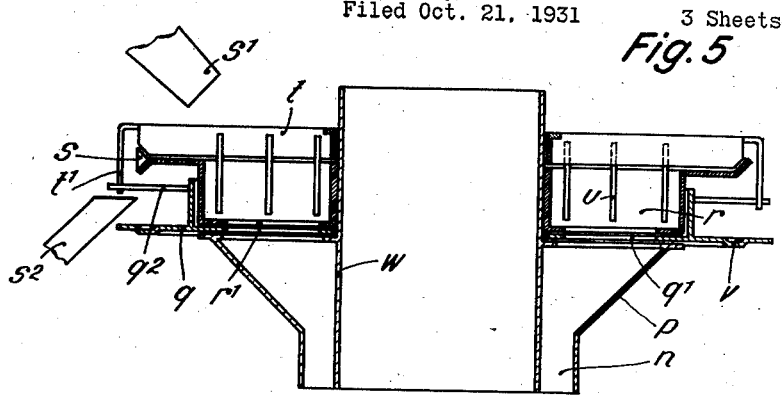
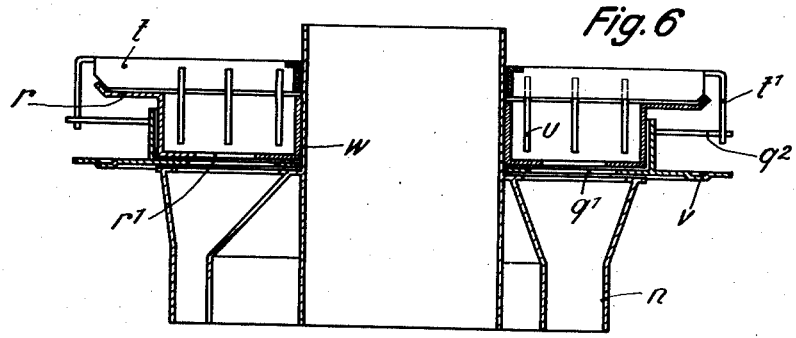
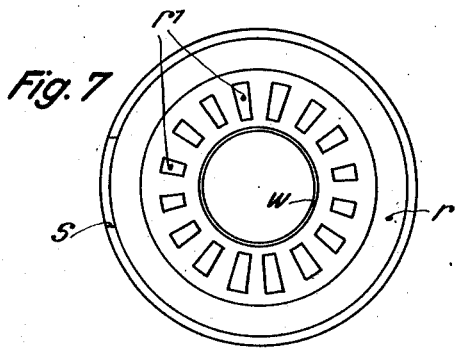
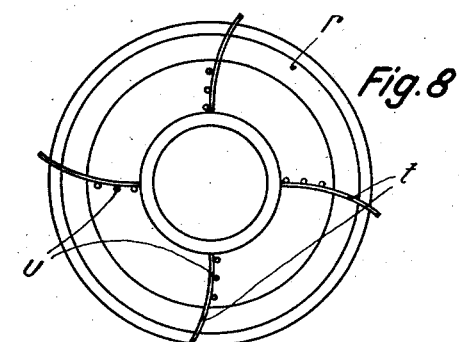
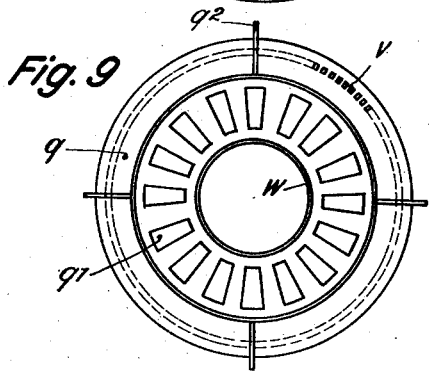
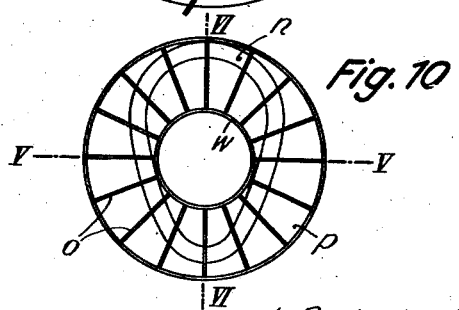
H. Pechstädt
INVENTOR
By: Marks & Clerk
ATTYS.

Patented June 5, 1934

1,961,981

UNITED STATES PATENT OFFICE 1,961,981

MACHINE FOR MOLDING PIPES AND OTHER HOLLOW ARTICLES

Herbert Pechstädt, Neustadt-Orla, Germany

Application October 21, 1931, Serial No. 570,230
In Germany October 21, 1930

8 Claims. (Cl. 25—37)

My invention relates to a machine for molding pipes and other hollow articles of concrete.

It is an object of my invention to provide a machine of this type which is readily adapted to articles of non-circular sections.

To this end I provide an exchangeable distributor with vanes subdividing it into compartments, and corresponding vanes on the tamper to which the concrete from the distributor compartments is delivered by gravity.

In molding machines as designed heretofore distributors have already been disposed but it was impracticable to consider various sections and the material was distributed uniformly throughout the section.

Uniform distribution is undesirable because the wall thicknesses of the several sections vary within wide limits so that with uniform supply of material under equal pressure the density was lacking uniformity in a very marked degree. Obviously this is not in conformity with the calculations requiring greater wall thickness at certain points, and may even cause local porosity in the finished articles.

I eliminate these drawbacks by my exchangeable distributor above the mold the lower end of which is shaped in conformity with a given section. The distributor may be subdivided into compartments throughout its depth by vanes or partitions, thereby subdividing the entire section of the mold into any number of units corresponding to the number of the compartments. Means are provided for supplying to each unit a quantity of material which is adapted to its size.

It is another object of my invention to prevent interference of the core with the exchangeable distributor. The distributor has a central sleeve in close vicinity to the moving members connected to the tamper. When the distributor is exchanged it is in the way of the core if the core is extracted in upward direction. Therefore I so arrange the core that it is extracted in downward direction. This also prevents spoiling of the upper portion of the article in the mold.

In the accompanying drawings a machine embodying my invention is illustrated by way of example.

In the drawings

Figs. 5 and 6 are sections on the lines V—V and VI—VI, respectively, in Fig. 10, Fig. 7 is a plan view of the distributor hopper, Fig. 8 is a plan view of the agitator, Fig. 9 is a plan view of the distributor hopper valve, and Fig. 10 is a plan view of the distributor.

Figure 1:
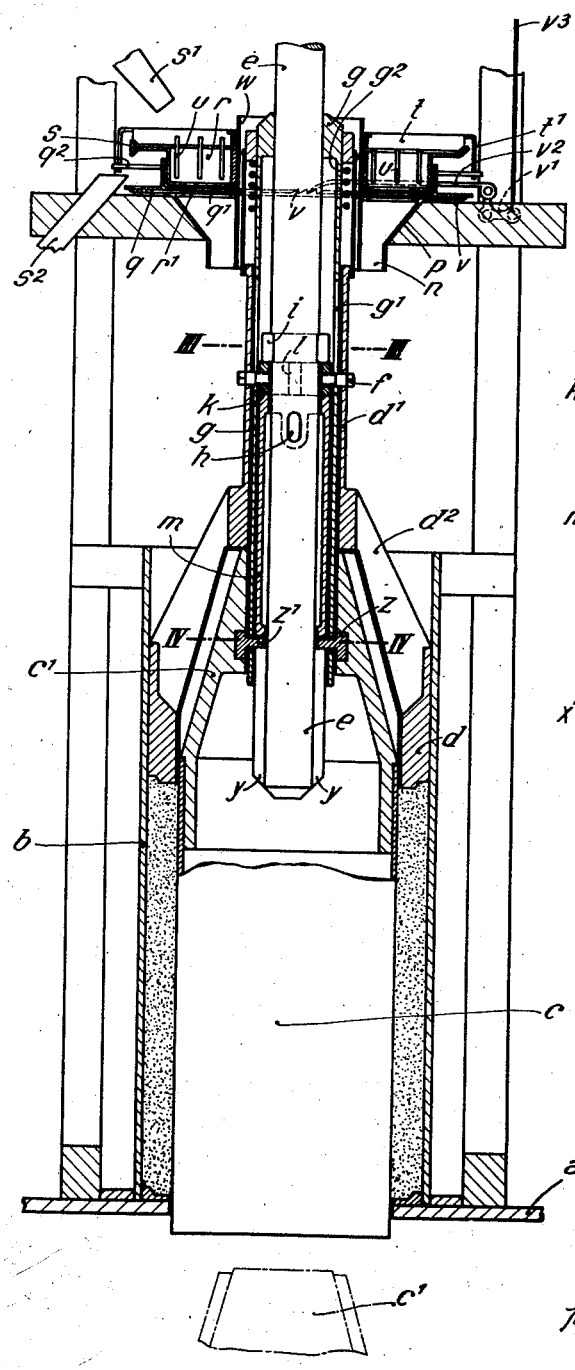
Fig. 1 is a sectional elevation of the machine.

Referring now to the drawings, $a$ is the base plate of the machine on which are mounted the mold $b$, the core $c$, with its tapered upper end $c'$, and a frame, here shown as wooden uprights and girders supporting the distributor hopper $r$ and the distributor $p$ with its lower end $n$ shaped in conformity with a given article, as shown in Fig. 10.

$e$ is a tamping rod which is mounted to reciprocate in the tapered upper end $c'$ of the core and extends upwardly through the central tube $w$ of the distributor $p$. $z$ is a clutching ring in the core end $c'$, with two pins $z'$ projecting inwardly therefrom. $g$ is a fixed outer sleeve surrounding the rod $e$, with a boss at its upper end in which the rod slides, and its lower end projecting into the cavity of the core end $c'$. $m$ is an inner sleeve between the sleeve $g$ and the rod $e$, with its lower end bearing on the ring $z$, and its upper end abutting below a ring $k$ which is held on the rod $e$ by a lower key $h$ and an upper key $i$. The key $h$ extends through the walls of the sleeve so that the sleeve $m$, and the ring $k$, move with the rod $e$ while the sleeve $g$ remains stationary.

Projecting radially through slots $g'$ in the fixed outer sleeve $g$ are two pins $f$ which engage in holes of a tamper sleeve $d'$. The annular tamper $d$ is connected to the lower end of its sleeve in a manner to be described. The tamper sleeve $d'$ sits on the outer sleeve $g$ and its upper end projects into a spring casing on the boss of sleeve $g$, with a spring $g^2$ in the casing.

The rod $e$, with the sleeve $m$, is free to rotate through an angle of 90 degrees in the core end $c'$. The key $i$ which in the position Fig. 2 bears on the ring $k$, enters two slots in the inner wall of ring which are best seen at 1 in Fig. 3, after the rod $e$ has been rotated through 90 degs. so that the rod is lowered for the length of the slots.

Figure 4:
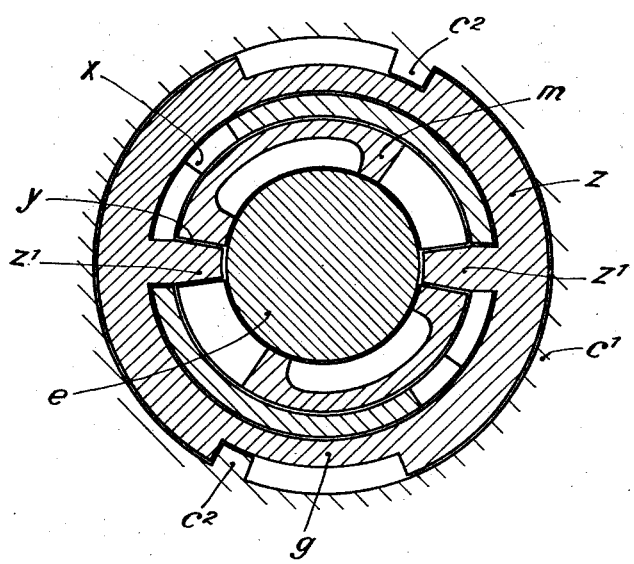

The two pins $z$ on the ring $z$ project inwardly through the sleeves $g$ and $m$, Fig. 4, and engage in L slots in the sleeves $g$ and $m$ like bayonet joints. The horizontal reaches of the slots are at the same level, Fig. 2, and the vertical reach of each slot $x$ in the sleeve $g$, and $y$ in the sleeve $m$, extends in parallel to the axis of the sleeves. The vertical reaches $x$, $y$ are pitched 45 degs. apart in each pair, Fig. 4. The outer edge of ring $z$ is notched at two diametrically opposite points, and lugs $c^2$ project into the notches from the cavity of core end $c'$.

$s'$ is a chute for supplying material to the distributor hopper $r$ which is annular and seated on the central tube $w$. $t$ are wipers which rotate about the tube $w$, $s$ is an overflow to which the excess material is delivered, $s^2$ is a chute for receiving the material, and $u$ are agitator rods on the wipers $t$. $r'$ are openings in the bottom of the hopper $t$, Fig. 7, which are of unequal size as required by the mold sections supplied by them, $q$ is a valve below the bottom of the hopper $r$, with openings $q'$ corresponding to the openings $r'$ but of the same size, $v$ is a circular rack on the valve $q$, $v^2$, Fig. 1, is a ratchet pawl adapted to engage in the rack, $v'$ is a bell-crank lever for reciprocating the pawl, and $v^3$ is a cable or rod for rocking the bell-crank lever which is preferably connected to the mechanism, not shown, for operating the machine. As the valve $q$ rotates, it alternately lays open and closes the openings $r'$. $q^2$ are dogs on the valve $q$ which rotate the wipers $t$ through the medium of angle bars $t'$.

The distributor $p$, with its opening $n$ at the lower end, Fig. 10, is subdivided throughout its depth by vanes or partitions $o$. The number of compartments thus obtained is equal to the number of holes $r'$, $q'$. The distributor, with its central tube $w$, closely surrounds the tamping rod $e$ and the parts thereon, and is detachable with the hopper $u$, the valve $q$ and the wipers $t$. The wipers, in turn, may be removed from the tube $w$ separately.

The material from the distributor $p$ drops onto vanes $d^2$ extending from the lower end of sleeve $d'$ to the annular tamper $d$ which correspond to the vanes or partitions $o$ in the distributor $p$. The tamper $d$ is recessed at the top, with an inwardly inclined shoulder, so that the material is readily deflected inwardly.

The material from chute $s'$ is metered by the hopper $r$ and the valve $q$, and a variable quantity of material proportioned to the size of the compartments between the vanes or partitions $o$ of the distributor $p$ is delivered. While the valve $q$ rotates for delivering the material the agitators $u$ keep it moving. A blower, not shown, or any other suitable means might be provided for agitating the material. The material is finally delivered to the vanes $d^2$ which distribute it over the several portions of the section as required, and tamped in the mold $b$.

Figure 2:
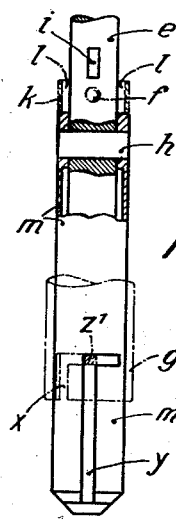
Fig. 2 is an elevation, partly in section, of its tamping rod and accessories.
Figure 3:
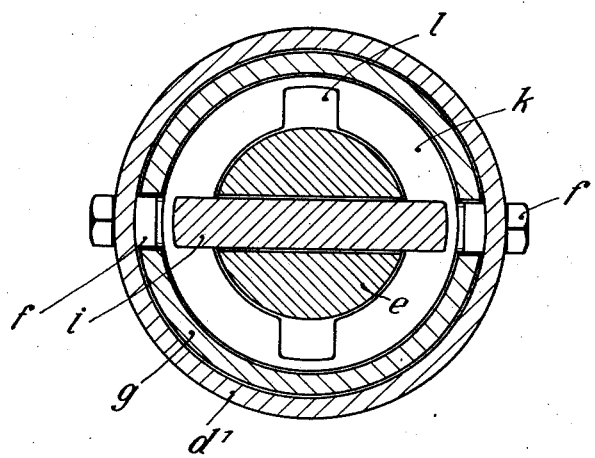
Figs. 3 and 4 are sections on the lines III—III and IV—IV in Fig. 1, respectively, drawn to a larger scale.

The pins $z'$ of the ring $z$ are free to slide in the slots $y$, Fig. 2, while tamping is performed by reciprocating the rod $e$.

When the pipe or other article in the mold $b$ has been finished the core is lowered into the position shown in dot-and-dash lines in Fig. 1. Lowering of the core is preferably effected by the rod $e$ after the connection of the rod and the sleeve $d'$ has been interrupted. The rod $e$ is turned to the right through 45 degs. so that the pins $z'$ are engaged by the horizontal reaches of slots $y$ and the core $c$ is connected to the rod $e$. The rod $e$ is now turned to the right through another 45 degs. and the pins $z'$ on the ring $z$ are entrained through the same angle until the lugs $c^2$ are engaged by the opposite ends of their notches. The pins $z'$ now register with the vertical slots in the fixed sleeve $g$ which supports the core $c$ and the core is disconnected from the sleeve. The sleeve itself cannot move. When the rod $e$ has been rotated through full 90 degs. the wedge $i$ enters the slots $l$ in the ring $k$ and the rod $e$ with the core $c$ can be lowered. Core and rod are now separated by rotating the rod $e$ backwards through 45 degs., and the rod, with the sleeves $m$ and $d'$, can now be raised for exchanging the mold $b$. The normally fixed sleeve $g$ is also raised after the upper end of sleeve $d'$ has engaged below the spring $g^2$.

For the next operation of the machine the manipulations just described are performed in opposite sequence.

I claim:

1. A machine for molding articles of non-circular section, comprising a mold, a tamper reciprocating in said mold, a hopper for the material to be molded of other section than that of the mold, a plurality of chutes for the passage of the material, arranged between said hopper and said mold and means for distributing said material in said chutes in proportion to the non-circular section of the mold.

2. A machine for molding articles of non-circular section, comprising a mold, a tamper reciprocating in said mold, a hopper for the material to be molded, arranged on top of said mold and tamper and having a section other than that of the mold, vanes between the hopper outlet and said mold, so as to form a plurality of chutes and means arranged in said hopper outlet for distributing said material in said chutes in proportion to the non-circular section of said mold.

3. A machine for molding articles of non-circular section, comprising a mold, a tamper reciprocating in said mold, a hopper for the material to be molded of other section than that mold and vanes between the hopper outlet and said mold, so as to form a plurality of chutes, said hopper having a plurality of openings in its bottom, one for each chute, the size of the openings varying in proportion with the areas of mold section at the delivery end of their respective chutes.

4. A machine for molding articles of non-circular section, comprising a mold, a tamper reciprocating in said mold, a hopper for the material to be molded of other section than that mold, a plurality of chutes for the passage of the material, arranged between said hopper and said mold, said hopper having a plurality of openings in its bottom, one for each chute, the size of the openings varying in proportion with the areas of mold sections at the delivery end of their respective chutes, a valve below said hopper for controlling the passage of the material through said chutes and means for controlling said valve in corelation with the reciprocations of said tamper.

5. A machine for molding articles of non-circular section, comprising a mold, a tamper reciprocating in said mold, a rod for operating said tamper, a hopper for the material to be molded of other section than that mold, a plurality of chutes for the passage of the material, arranged between said hopper and said mold, said hopper having a plurality of openings in its bottom, one for each chute, the size of the openings varying in proportion with the areas of mold section at the delivery end of their respective chutes, a valve below said hopper for controlling the passage of the material through the chutes, said valve having an opening for each chute, the openings of the valve being all of the size of the largest openings in the hopper and means for controlling said valve operatively connected with said rod, so as to open the valve when the tamper moves in one direction and to close the valve when the tamper moves in the opposite direction.

6. A machine for molding articles of non-circular section, comprising a mold, a tamper reciprocating in said mold, a hopper for the material to be molded of other section than that of the mold, a plurality of chutes for the passage of the material, arranged between said hopper and said mold, means for distributing said material in said chutes in proportion to the non-circular section of the mold, a valve below said hopper for controlling the passage of the material through said chutes, control means for said valve in operative connection with said rod, a rotary wiper in said hopper, stirring means on said wiper, and driving means for said wiper, connected with that valve.

7. A machine for molding hollow articles of non-circular section, comprising a mold, a tamper reciprocating in said mold, a rod for operating said tamper, means for detachably connecting said tamper to said rod, a core in said mold, means for detachably connecting said core to said rod when the connection between the said tamper and said rod is broken and means for distributing the material to be molded across the non-circular section of said mold in conformity with said section of the mold.

8. A machine for molding hollow articles of non-circular section, comprising a mold, a tamper reciprocating in said mold, a rod for operating said tamper, a bayonet lock on said rod for detachably connecting said tamper to said rod, a core in said mold, a second bayonet lock on said rod for detachably connecting said core to said rod, this lock being so arranged with respect to the first lock, that it opens when the first lock closes and vice versa, a hopper for the material to be molded, arranged above said mold and tamper and means for distributing said material across the non-circular section of said mold in conformity with said section of the mold.

HERBERT PECHSTÄDT.